(12) United States Patent
Scheegaβ et al.

(10) Patent No.: US 8,260,441 B2
(45) Date of Patent: Sep. 4, 2012

(54) METHOD FOR COMPUTER-SUPPORTED CONTROL AND/OR REGULATION OF A TECHNICAL SYSTEM

(75) Inventors: Daniel Scheegaβ, Amsterdam (NL); Steffen Udluft, Eichenau (DE)

(73) Assignee: Siemens Aktiengesellschaft, München (DE)

( * ) Notice: Subject to any disclaimer, the term of this patent is extended or adjusted under 35 U.S.C. 154(b) by 80 days.

(21) Appl. No.: 12/595,092

(22) PCT Filed: Apr. 4, 2008

(86) PCT No.: PCT/EP2008/054099
§ 371 (c)(1),
(2), (4) Date: Jun. 11, 2010

(87) PCT Pub. No.: WO2008/125522
PCT Pub. Date: Oct. 23, 2008

(65) Prior Publication Data
US 2010/0257866 A1    Oct. 14, 2010

(30) Foreign Application Priority Data
Apr. 12, 2007    (DE) .................. 10 2007 017 259

(51) Int. Cl.
*G06F 19/00*    (2011.01)

(52) U.S. Cl. ........................................ 700/43; 706/20

(58) Field of Classification Search .................. 700/14, 700/31, 43; 60/773, 772; 706/12, 23, 25, 706/45, 48, 20; 409/12, 26, 27; 407/20
See application file for complete search history.

(56) References Cited

PUBLICATIONS

G. Scott et al.: "Refining PID Controllers Using Neural Networks", Neural Computation, Nr. 4, 1992, pp. 746-757.
Kalogirou S A: "Artificial intelligence for the modeling and control of combustion processes: a review", Progress in Energy and Combustion Science, Elsevier Science Publishers, Amsterdam, NL, vol. 29, No. 6, (Jan. 1, 2003), pp. 515-566.
Kumpati S Nearendra et al: "Adaptive Control Using Multiple Models", IEEE Transactions on Automatic Control, IEEE Service Center, Los Alamitos, CA, US, vol. 42, No. 2 (Feb. 1, 1997) pp. 171-187.
Karsten Berns, Thorsten Kolb: "Neurale Netze für technische Anwendungen", 1994, Springer, Berlin, pp. 82-91.
Andreas Zell: "Simulation Neuraler Netze", Addison-Wesley, Bonn, pp. 71-86, 97-103, 105-114.
A. M. Schaefer and S. Udluft: "Solving Partially Observable Reinforcement Learning Problems with Recurrent Neural Networks", Proceedings of the European Conference on Machine Learning (2005); Others.
Tetsuro Kojima et al. "A Study on Learning Efficiency of the Q-learning in Action Control", Technical Report of IEICE, the Institute of Electronics, Information and Communication Engineers, Mar. 25, 1994, vol. 93, No. 537, pp. 229-236; Magazine.

*Primary Examiner* — Kidest Bahta

(57)    ABSTRACT

A method for computer-supported control and/or regulation of a technical system is provided. In the method a reinforcing learning method and an artificial neuronal network are used. In a preferred embodiment, parallel feed-forward networks are connected together such that the global architecture meets an optimal criterion. The network thus approximates the observed benefits as predictor for the expected benefits. In this manner, actual observations are used in an optimal manner to determine a quality function. The quality function obtained intrinsically from the network provides the optimal action selection rule for the given control problem. The method may be applied to any technical system for regulation or control. A preferred field of application is the regulation or control of turbines, in particular a gas turbine.

20 Claims, 2 Drawing Sheets

METHOD FOR COMPUTER-SUPPORTED CONTROL AND/OR REGULATION OF A TECHNICAL SYSTEM

CROSS REFERENCE TO RELATED APPLICATIONS

This application is the US National Stage of International Application No. PCT/EP2008/054099, filed Apr. 4, 2008 and claims the benefit thereof. The International Application claims the benefits of German application No. 10 2007 017 259.3 DE filed Apr. 12, 2007, both of the applications are incorporated by reference herein in their entirety.

FIELD OF INVENTION

The invention relates to a method for computer-aided control and/or regulation of the technical system and to a corresponding computer program product.

BACKGROUND OF INVENTION

In the control of complex technical systems it is often desirable that the action to be carried out on the technical systems is selected such that an advantageous desired dynamic behavior of the technical system is obtained. The dynamic behavior however cannot be predicted easily with complex technical systems, so the corresponding computer-aided prediction methods will be needed in order to estimate the future behavior of the technical system and select suitable actions for regulation or control of the technical system accordingly.

Nowadays the control of technical systems is often based on expert knowledge, i.e. the automatic regulation of the system is created on the basis of this expert knowledge. However approaches are also known in which technical systems are controlled with the aid of known methods of what is referred to as reinforcement learning. The known methods are however not generally applicable to any given technical systems and often do not supply sufficiently good results.

The control of a technical system based on modeling of the technical system with neural networks, which are learned with an error back-propagation method, is described in the document by G. Scott et al., "Refining PID Controllers Using Neural Networks", Neural Computation, No. 4, 1992, Pages 746-757.

The use of neural networks for modeling and control of technical systems in the form of combustion systems is explained in the document by Kalogirou S. A., "Artificial intelligence for the modeling and control of combustion processes: a review", Progress in Energy and Combustion Science, Elsevier Science Publishers, Amsterdam, NL, Vol. 29, No. 6, 1. January 2003, Pages 515-566.

The document Kumpati S. Narendra et al., "Adaptive Control Using Multiple Models", IEEE Transactions on Automatic Control, IEEE Service Center, Los Alamitos, Calif., US, Bd. 42, Nr. 2, 1. February 1997, discloses the adaptive control of a technical system based on a plurality of models, with each model corresponding to a different environment in which the technical installation operates. Based on the plurality of models a suitable control for the technical installation is then selected.

SUMMARY OF INVENTION

The object of the invention is therefore to create a method for computer-aided control and/or regulation of a technical system which is generally-applicable for use on any given technical systems and delivers good results.

In the inventive method the dynamic behavior of a technical system is observed for a number of points in time, with the dynamic behavior for each point in time being characterized by a state of the technical system and an action executed on the technical system, with a respective action at a respective point in time leading to a follow-up state of the technical system at the next point in time.

To achieve optimum control or regulation of the technical system, an action selection rule is learnt based on data sets, with each data set comprising the state of the technical system at a respective point in time, the action executed at the point in time and also the follow-up state and with each data set being assigned an evaluation.

A state of the technical system in this case is especially a state vector with one or more variables, with the variables for example being observed state variables of the technical system. Similarly an action to be executed by a corresponding vector on the technical system can also consist of a plurality of action variables, with the action variables especially representing parameters that can be set on the technical system.

The inventive method is characterized by a specific variant of the learning of the action selection rules, comprising the following steps:
  i) Modeling of a quality function by one or more neural networks comprising the states and actions of the technical system as parameters;
  ii) Learning of the neural network or networks on the basis of an optimality criterion which depends on the evaluations of the data sets and on the quality function.

With such a method by appropriate learning of the neural networks an optimum action selection rule is determined in a simple and effective way which depends on the evaluations of the data sets, with the action selection rule being designed such that in a state the action with the best evaluation will be selected wherever possible. With the learnt action selection rules the actual regulation or control of the technical system is then undertaken by the actions to be executed on the technical system being selected with the learnt action selection regulation based the learnt neural network or networks. The inventive method has been checked on the basis of test data sets and it has been shown that very good results will be achieved with the method.

In a preferred embodiment of the inventive method the quality function is modeled by the neural network or networks such that an evaluation function will be adapted to the evaluations of the data sets.

For the control or regulation of the technical system with the learnt action selection rules, in a preferred variant of the invention that action is preferably selected in a respective state for which the highest value of the quality function is created by the learnt neural network or networks.

In an especially preferred embodiment of the inventive method the quality function is modeled with a plurality of neural networks, with each network of the plurality of neural networks being a feed-forward network, comprising the following layers:
  An input layer comprising a respective state of the technical system;
  One or more hidden layers with hidden variables;
  An output layer comprising the quality function.

In this embodiment each of the networks of the plurality of neural networks parameterizes an action that it is possible to execute in the respective state.

Instead of using a plurality neural networks for modeling the quality function, it is also possible in one variant of the invention for the quality function to be modeled by a single neural network, with the neural network again being a feed-forward network, comprising the following layers:

An input layer comprising a respective state of the technical system and the action able to be executed in the respective state;
One or more hidden layers with hidden variables;
An output layer comprising the quality function.

When a single neural network is used the action itself thus also represents a variable of the input layer, and it is no longer necessary to generate a large number of feed-forward networks for each possible action value. The above-mentioned feed-forward networks will also be designed as multilayer perceptrons and are structures of artificial neural networks sufficiently well known from the prior art.

To learn the neural network or networks in the inventive method the back-propagation method sufficiently well known from the prior art is preferably used.

The optimality criterion can be selected differently in the inventive method, with preferably that optimality criterion being used that parameterizes an optimum dynamic behavior of the technical system. Possible optimality criteria are for example the minimization of the Bellman residuum or reaching the checkpoint of the Bellman iteration. The Bellman residuum or the Bellman iteration are known to the person skilled in the art in the area of reinforcement learning and are therefore not explained in any greater detail at this point. The mathematical definition of these two optimality criteria can however be explicitly found in the detailed description.

In an especially preferred embodiment of the inventive method the optimality criterion includes a selectable parameter, through the modification of which the optimality criterion is adapted. This creates a flexible option for adapting the inventive method to the optimality criterion best suited to the predetermined data set.

In a further embodiment of the inventive method the history of previous states and actions of the technical system can also be taken into consideration in a suitable way. This is done by the states in the data sets being hidden states of the technical system that will be generated by a recurrent neural network with the aid of source data sets, with the source data sets each comprising an observed state of the technical system, an action executed in the observed state and also the resulting follow-up state. The dynamic behavior of the technical system in particular is modeled with the recurrent neural network, with the recurrent neural network being formed by at least one input layer comprising the observed states of the technical system and the actions executed on the technical system, at least one hidden recurrent layer comprising the hidden states of the technical system and at least one output layer comprising the observed states of the technical system. The recurrent neural network is again learned with a suitable learning method, especially also with the known back-propagation method.

Any given technical systems can be controlled and regulated with the inventive method, but a preferred area of application is turbines, especially gas turbines. In the control or regulation of a gas turbine the states of the technical system and/or the actions able to be executed in the respective states are one or more the following variables:

Overall power of the gas turbine; One or more pressures and/or temperatures in the gas turbine or in the vicinity of the gas turbine; Combustion chamber accelerations in the gas turbine; One or more setting parameters in the gas turbine, especially valve settings and/or fuel ratios and/or inlet guide vane positions.

As well as the method described above, the invention further relates to a computer program product with program code stored on a machine-readable medium for executing the inventive method when the program runs on a computer.

BRIEF DESCRIPTION OF THE DRAWINGS

Exemplary embodiments of the invention are explained in detail below with reference to the enclosed figures.
In which.

DETAILED DESCRIPTION OF INVENTION

Figure 1:
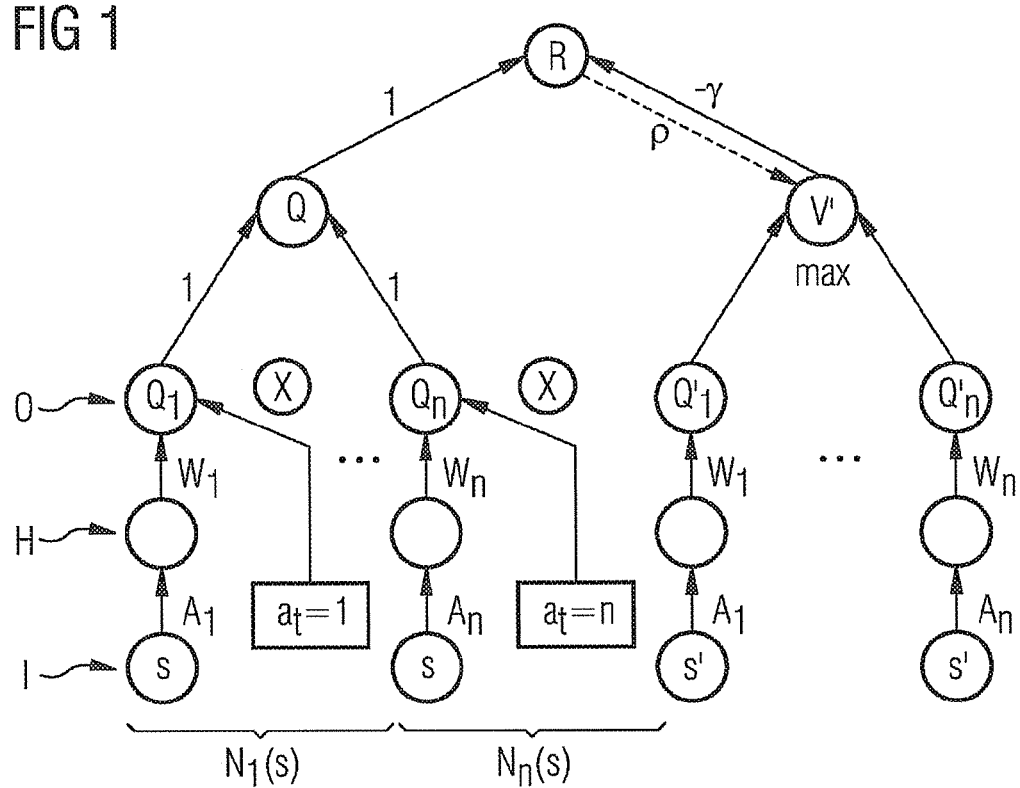
FIG. 1 shows a schematic diagram of a first embodiment of the inventive method.

The embodiments of the inventive method described below are based on a quantity of data sets that are observed for any given technical system, i.e. have been measured or determined experimentally. An especially preferred application of a technical system here is the control of a gas turbine, for which data is present in the faun of state variables of the turbine, for example the overall power of the gas turbine, one of more pressures and/or temperatures in the gas turbine, combustion chamber accelerations and the like. In such cases data sets are available for a plurality of consecutive points in time, with each data set being characterized by a state which is usually a state vector with a plurality of state variables, by an action which represents the modification of state variables or other settable parameters of the technical system, and also by a follow-up state which reflects the values of the state variables after execution of the action. In addition there is an evaluation of a reward for each data set which reflects the quality of the action at the respective point in time for the control of the technical system. The evaluation is preferably designed here such that the best or optimum control of the technical system is achieved by actions with high evaluations or rewards at the different points in time during the operation of the technical system.

In embodiments of the inventive method described below an action selection rule is now learnt on the basis of the observed data sets of the technical system with a reinforcement learning method with which the technical system is then able to be operated in a suitable way. In this case the action selection rule specifies, for a state of the technical system, which action is the best action to be performed in this state. The technical system in this case is regarded as a stochastic dynamic system, with the reinforcement learning method for determination of the action selection rule being regarded as a regression task in which a reward function is adapted to the observed data sets.

In the learning method described below the action selection rule which can be used in the optimum way for control of the technical system is sought. Mathematically the states, the actions and the follow-up states are regarded here as what is known as a Markov decision process. A Markov decision process is generally given by a state space S, a set of actions A that can be selected in the different states and the dynamic, which is regarded as the transitional probability distribution $P_T:S \times A \times S \dashrightarrow [0.1]$ which depends on the current state s, the selected action a and the follow-up state s'. The transition from a state to the follow-up state is characterized by so-called rewards $R(s,a,s')$ that are functions of the current state, the action and the follow-up state. The rewards are defined by a reward probability distribution $P_R$ with the expected value of the reward $$ER = \int \mathfrak{R} r P_R(s,a,s',r) dr, s, s' \in S, a \in AE.$$

In accordance with an embodiment of the inventive method described below the maximum of a discounting Q function is sought, which corresponds to the quality function as defined in the claims and is defined by the Bellman equation sufficiently well known from the state of the art as follows:

$$Q^\pi((s,a) = E_{s'}(R(s,a,s') + \gamma Q^\pi(s', \pi(s'))) \quad (1).$$

The maximization is undertaken here in the so called rule space $\Pi = (S \to A)$ over all possible states s and actions a, with $0 < \gamma < 1$ being the discounting factor, s' the follow-up state of s and $\pi \in \Pi$ being the action selection rule used. The optimum action selection rule is that rule which uses actions that maximize the (best) Q function, with the best Q function being given by the following equation:

$$Q^{\pi opt}(s,a) = Q(s,a) = E_{s'}(R(s,a,s') + \gamma \max_{a'} Q(s',a')) \quad (2).$$

This is equivalent to the search using the following action selection rule:

$$\pi(s) = \operatorname*{argmax}_{a} Q(s, a). \quad (3)$$

In addition, the so-called value function is defined for the description below over S as $V(s) = \max_a Q(s,a)$.

In embodiments of the inventive method described below a technical system is considered in which the states of the system are continuous and a discrete set of actions able to be executed in a respective state is available. The dynamic of system is probabilistic in such cases.

Figure 2:
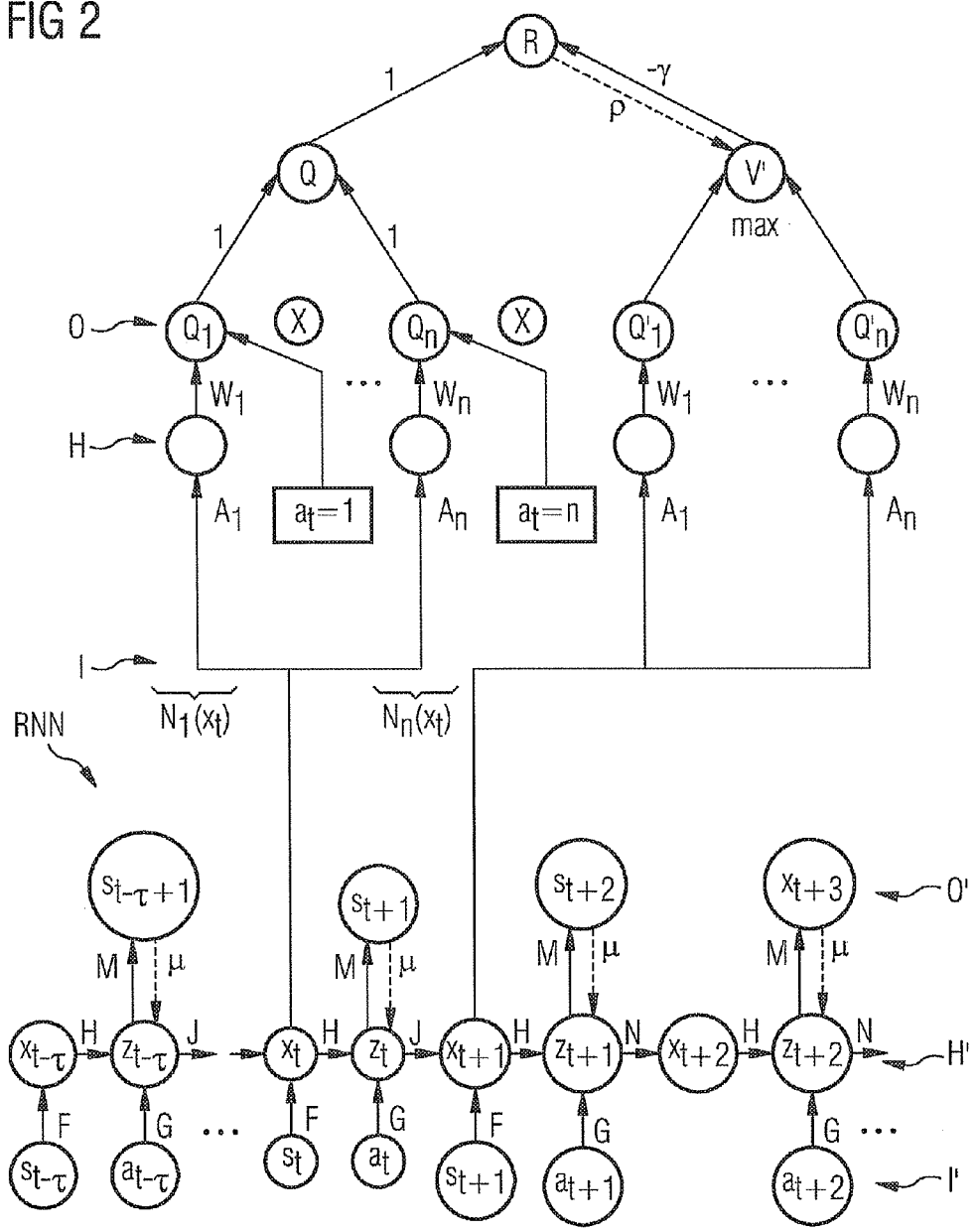
FIG. 2 shows a schematic diagram of a second embodiment of the inventive method.

In the embodiments of FIG. 1 and FIG. 2 the Q function described above is described for each possible action in the respective state of the technical system by a so-called feed-forward network or a multilayer perceptron $N_a(s) = Q(s,a)$. The reward function to be adapted in the embodiments described here is thus given according to equation (1) by:

$$R(s, a, s') = N_a(s) - \gamma \max_{a'} N_{A'}(S'). \quad (4)$$

In this case the max operator is modeled by a suitable architecture, in which case this type of modeling is sufficiently well known to the person skilled in the art. In the subsequent embodiments, for modeling the reward function according to equation (2), the back-propagation algorithm sufficiently well known from the prior art is used, with the optimization problem being resolved by the minimization of the (quadratic) Bellman residuum over all 1 observed transitions. 1 is thus the number of data sets in the observed data of the technical system. This minimization represents an optimality criterion as defined in the claims. Mathematically the quadratic Bellman residuum is given by the following equation:

$$L = \sum_{i=l}^{i} L_2^2 + \Omega(\Theta) = \sum_{i=l}^{l} (Q(s_i, a_i) - \gamma V(s_{i+1}) - r_i)^2 + \Omega(\Theta). \quad (5)$$

In this equation $\Theta$ represents the parameters of the artificial neural feed-forward network and especially comprises the weight matrices between the individual neuron layers in the feed-forward networks. $\Omega$ is a suitable regularization term. $r_i$ represents the observed reward or evaluation in a state $s_i$ from the data sets, and $s_{i+1}$ are impartial estimators of the expected values of the state variables of the follow-up state. The gradient of the error function in this case is given by the following equation:

$$\frac{dL}{d\Theta} = 2 \sum_{i=1}^{i} L_i \frac{d}{d\Theta}(Q(s_i, a_i) - \gamma V(s_{i+1})) + \frac{d}{d\Theta}\Omega(\Theta). \quad (6)$$

This gradient depends on the current Q function and the value function of the follow-up state. The optimality criterion set down above, in accordance with which the minimum of the quadratic Bellman residuum is determined, can if necessary also be replaced by an optimality criterion in accordance with which the checkpoint of the Bellman iteration is sought. This often leads to better solutions. In accordance with the Bellmann iteration the following expression is minimized iteratively until convergence of Q:

$$L = \sum_{i=l}^{i} ((Q(s_i, a_i) - y_i)^2 + \Omega(\Theta). \quad (7)$$

The following applies here $$y_i := \gamma V(S_{i+1}) \quad (8).$$

The gradient is then given by the following equation:

$$\frac{dL}{d\Theta} = 2 \sum_{i=1}^{i} L_i \frac{d}{d\Theta} Q(s_i, a_i) + \frac{d}{d\Theta}\Omega(\Theta). \quad (9)$$

By back substitution of $y_i$ the following equation system is then also obtained:

$$\sum_{i=1}^{l} (Q(s_i, a_i) - \gamma V(s_{i+1}) - r_i) \frac{d}{d\Theta} Q(s_i, a_i) + \frac{d}{d\Theta}\Omega(\Theta) = 0. \quad (10)$$

The solution of this equation system is then the checkpoint of the (regularized) Bellman iteration. The two above-mentioned gradients only differ in their direction terms and not in their error term. The last-mentioned gradient is thus generated by the value function proportion of the network blocking the gradient flow by the value function. In this way a further parameter p can be inserted into the optimality criterion, in order to vary between the two optimality criteria in accordance with the minimization of the Bellman residuum and the checkpoint of the Bellman iteration. The optimality criterion can thus be written in general terms as follows:

$$\sum_{i=1}^{l} (Q(s_i, a_i) - \gamma V(s_{i+1}) - r_i) \frac{d}{d\Theta} Q(s_i, a_i) - p\gamma V(s_{i+1})) + \frac{d}{d\Theta}\Omega(\Theta) = 0. \quad (11)$$

For p=1 the optimality criterion in accordance with the classical minimization of the Bellman residuum is then obtained, whereas for p=0 the reaching checkpoint of the Bellman iteration is obtained.

In summary, in the embodiment of the inventive method a Q function is modeled by neural networks, with the parameters of the individual neural networks being determined by a reinforcement learning method based on an optimality criterion. This procedure is shown again in FIG. 1. In FIG. 1 the circles each represent clusters of neurons, which are linked by weight matrices. Clusters R, Q and V' are the corresponding function values in accordance with the above equations, with V' standing for V(s'). The right-hand branch of FIG. 1 is coupled in this case via parameter y in accordance with equation (11) to cluster R. Likewise the upper parameter p, which is likewise contained in equation (11), is included as gradient flow control.

Initially for all possible n actions $a_t$ in a respective state s of the technical system corresponding neural networks $N_1(s)$, $N_n(s)$ initialized, with the networks featuring as input layer I the respective state and as output layer O the modeled Q function $Q_i, \ldots Q_n$ for the respective action 1, n. Between input layer I and output layer O there is a hidden layer H, with a plurality of intermediate layers able to be provided. For reasons of clarity only one layer is shown in FIG. 1. A weight matrix $A_1 \ldots, A_n$ and also corresponding weight vectors $w_1, \ldots w_n$ are reproduced as typical of the parameters of the network in each case.

For each of the neural networks $N_i(s)$ through $N_n(s)$ there is a corresponding pendant in the right-hand branch of the diagram of FIG. 1, with the input variables of the corresponding pendants being the respective follow-up state s'. $Q_1', \ldots, Q_n'$ thus correspond to the respective quality functions $Q_1', \ldots, Q_n'$ at time s'. The left and the right-hand branch are linked to each other via the reward function R described above. The method executes such that for a respective state s with associated action in accordance with a data set, that feed-forward network in the left-hand branch of FIG. 1 is activated which corresponds to the action assigned to the respective state in accordance with the data set. The activation of the respective neural network in the left-hand part of FIG. 1 is depicted by an x symbol enclosed within a circle. For the corresponding follow-up state s' thee corresponding V functions are then computed with the help of the maximum operator in the right-hand branch of FIG. 1 with copies of the neural networks from the left-hand branch In the method shown in FIG. 1 the Q function is modeled separately for each possible action $a_t$ by a neural network. In one variation it is also possible however for the Q function to be modeled via a single neural network which also contains as its input variables in the input layer the action a well as the state s. In this case n copies of the neural network of the left-hand part of FIG. 1 are created in the right-hand part of FIG. 1, with each copy in the input layer containing the follow-up state s' as well as a possible value of an action.

As a result, after execution of the learning method described above, in accordance with FIG. 1, n learnt neural networks with corresponding weight matrices or weight vectors are obtained. Subsequently an optimum control of the technical system can be undertaken with these learnt neural networks by the Q function being computed for an instantaneous state of the system for all n neural networks $N_1$ through $N_n$. The action of that neural network with the largest Q function value is then selected as the next action. With the follow-up state then produced the next state is again selected with the same pattern according to the same criterion of which neural network features the largest value of the Q function.

The method described above does not take the history of previous states into consideration, which leads to the functions not being able to be guaranteed if no Markov decision process is available. In a second embodiment of the inventive method this history can however also be taken into account. This occurs because the data set that will be used for learning the neural networks has itself again been created from a source data set. The source data set here is the data set which is included in the embodiment of FIG. 1 directly for learning the neural network or networks. In the second embodiment, which is shown in FIG. 2, this source data set is now used for modeling the dynamic behavior of the technical system with a recurrent neural network RNN, which comprises an input layer I', an extended layer H' and an output layer O'. This neural network comprises the internal states $x_t, z_t, t \in t-\tau, \ldots, t+1$ and also the weight matrices F, G, H, J. The transitions between the states are defined here by the following equations:

$$x_t = \tan h(Fs_t + Jz_{t-1}) \quad (9)$$

$$z_t = Ga_t + Hx_t \quad (10).$$

By means of a matrix M, which maps the internal state to the external state, the follow-up state can be reached by fulfilling the following conditions:

$$\|Mz_t - s_{t+1}\| = \min. \quad (11).$$

With known algorithms in accordance with the above equations the parameters of the recurrent neural network (i.e. the weight matrices of the network) are determined such that the recurrent neural network generates the observed data sets at the respective point in time very well. The recurrent neural network in this case is again learnt with a back-propagation method sufficiently well known from the prior art. The modeling of the dynamic behavior by means of the recurrent neural network RNN is sufficiently well known to the person skilled in the art and will therefore not be explained in detail. By contrast with the method of FIG. 1 the hidden states $x_t$ or $x_t + 1$ are now included as input variables in the input layer I instead of the states s or s'. Otherwise the learning method of FIG. 2 corresponds to the learning method of FIG. 1, which is evident from the fact that the part above the recurrent neural network RNN is identical with FIG. 1. A further description of the learning of neural networks $N_1$ to $N_n$ is therefore dispensed with. In the recurrent neural network in accordance with FIG. 2 another parameter p is also included, with which the learning rate of the recurrent neural network is adapted compared to the learning rate of the individual feed-forward networks. In addition matrixes N will be used which will also be described below.

The architecture shown in FIG. 2 makes it possible to use only one recurrent neural network both for the Q function and also for the value function. The recurrent neural network is in a position here to approximate a deterministic dynamic system with any given accuracy, which is however not possible for a stochastic dynamic system. This does not represent any restriction however, since the construction of the internal hidden state can be viewed as a transformation into a suitable feature space for the stochastic reinforcement learning method by the feed-forward networks. In the deterministic case this feature space is identical with the exact description of all information that determines the future, whereas in the general stochastic case the internal state must be generated such that the expected future will be predicted. Therefore in the recurrent neural network from FIG. 2 an autonomous future proportion is used if internal states are predicted without observations from the Markov process. In FIG. 2 these are the states $x_t$ for $t > i+1$ and the following applies:

$$x_t = \tan h(Nz_{t-1}), t > i+1.$$

This is sufficient since the Markov property can be reconstructed by the knowledge about the expected future states. The recurrent architecture in accordance with FIG. 2 described above makes possible the automatic reconstruction of an underlying Markov process of principally any given order. The user of the inventive method can thus use more information from the data and has to provide less expert information.

The above described embodiments in accordance with FIG. 1 and FIG. 2 of the inventive method have been tested on the basis of problems known from the prior art. The method has especially been applied to the known cart pole problem, in accordance with which a pole is to be balanced in a cart moving on a level surface for as long as possible. It has been shown here that the cart pole problem can be solved very well with the inventive learnt neural networks. The best results were obtained here when p=0 was selected. However good results were also achieved for p>0.

The method described above offers an information-efficient approach to the solution for general optimum control problems in any given technical areas, with it being possible, with just a few available data sets, also to deal with complex control problems that cannot be satisfactorily resolved with classical methods.

The invention claimed is:

1. A computer-implemented method for a computer-aided control and/or regulation of a technical system, comprising:
 representing in a plurality of data sets based on observed data for the technical system a dynamic behavior of the technical system for a plurality of different points in time by a state of the technical system and an action executed on the technical system, with a respective action at a respective time leading to a follow-up state of the technical system at a next point in time;
 implementing reinforcement learning via a neural network executed on a processor of a computer to derive an optimum action selection rule, the reinforcement learning implemented on the plurality of data sets, each data set including the state at a respective point in time, the action executed in the state at the point in time, and the follow-up state and whereby each data set is assigned an evaluation, the reinforcement learning of the optimum action selection rule based on rewards that depend on a quality function for the state and action and on a value function for the follow-up state, comprising:
 (a) modeling of the quality function by the neural network reflecting a quality of an action for the plurality of states and the plurality of actions of the technical system, and
 (b) determining parameters of the neural network by reinforced learning of the neural network on the basis of an optimality criterion that depends on the plurality of evaluations of the plurality of data sets and the quality function; and
 regulating and/or controlling the technical system by selecting the plurality actions to be carried out on the technical system using the learned optimum action selection rule based on the learned neural network.

2. The method as claimed in claim 1, wherein the quality function is modeled by the neural network such that an evaluation function is adapted to the plurality of evaluations of the plurality of data sets.

3. The method as claimed in claim 1, wherein during the learning, the action is selected in a respective state for which a highest value of the quality function will be created by the neural network.

4. The method as claimed in claim 1,
 wherein the quality function is modeled with a plurality neural networks,
 wherein each network of the plurality of neural networks forms a feed-forward network with an input layer including the respective state of the technical system, a hidden layer and an output layer which includes the quality function, and
 wherein each neural network parameterizes the action to be carried out in the respective state.

5. The method as claimed in claim 1,
 wherein the quality function is modeled by a single neural network, and
 wherein the neural network forms a feed-forward network with the input layer including the respective state of the technical system and the action to be executed in the respective state, a hidden layer and the output layer which includes the quality function.

6. The method as claimed in claim 1, wherein a back-propagation method is used for the learning of the neural network.

7. The method as claimed in claim 1, wherein the optimality criterion is selected such that an optimum dynamic behavior of the technical system is parameterized.

8. The method as claimed in claim 1, wherein the optimality criterion is a minimization of a Bellmann residuum.

9. The method as claimed in claim 1, wherein the optimality criterion is reaching the checkpoint of the Bellmann iteration.

10. The method as claimed in claim 1,
 wherein the optimality criterion includes a selectable parameter, and
 wherein by modifying the selectable parameter, the optimality criterion is adapted.

11. The method as claimed in claim 1, wherein the state of the technical system includes a first variable, and/or an action to be carried out on the technical system includes an action variable.

12. The method as claimed in claim 11, wherein the first variable is an observed state variable of the technical system.

13. The method as claimed in claim 1,
 wherein the plurality of states in the plurality data sets are hidden states of the technical system that are generated by a recurrent neural network with an aid of a plurality of source data sets, and
 wherein each source data set includes an observed state of the technical system, the action carried out in the observed state, and the follow-up state resulting from the action.

14. The method as claimed in claim 13,
 wherein the dynamic behavior of the technical system is modeled by the recurrent neural network, and
 wherein the recurrent neural network is formed by the input layer including the plurality of observed states of the technical system and the plurality of actions executed on the technical system, the hidden recurrent layer which includes the plurality of hidden states, and the output layer which also includes the plurality of observed states.

15. The method as claimed in claim 14, wherein the recurrent neural network is learned using a learning method.

16. The method as claimed in claim 15, wherein the learning method is a back-propagation method.

17. The method as claimed in claim 1, wherein the technical system is a turbine.

18. The method as claimed in claim 16, wherein the turbine is a gas turbine.

19. The method as claimed in claim 18,
 wherein the gas turbine is regulated and/or controlled with the method,
 wherein the plurality of the states of the technical system and/or the actions to be performed in the respective states includes a second variable selected from the group consisting of an overall power of the gas turbine, a pressure and/or a temperature in the gas turbine or in a vicinity of the gas turbine, combustion chamber accelerations in the gas turbine, a setting parameter at the gas turbine, and a combination thereof, and wherein the setting parameter may be a valve setting and/or a fuel ratio and/or an inlet guide vane position.

20. A computer program product with program code stored on a non-transitory machine-readable medium, when the program executes on a processor of a computer, the program comprising:

representing in a plurality of data sets based on observed data for the technical system a dynamic behavior of the technical system for a plurality of different points in time by a state of the technical system and an action executed on the technical system, with a respective action at a respective time leading to a follow-up state of the technical system at a next point in time;

implementing reinforcement learning via a neural network executed on a processor of a computer to derive an optimum action selection rule, the reinforcement learning implemented on the plurality of data sets, each data set including the state at a respective point in time, the action executed in the state at the point in time, and the follow-up state and whereby each data set is assigned an evaluation, the reinforcement learning of the optimum action selection rule based on rewards that depend on a quality function for the state and action and on a value function for the follow-up state, comprising:

(a) modeling of the quality function by the neural network reflecting a quality of an action for the plurality of states and the plurality of actions of the technical system, and (b) determining parameters of the neural network by reinforced learning of the neural network on the basis of an optimality criterion that depends on the plurality of evaluations of the plurality of data sets and the quality function; and regulating and/or controlling the technical system by selecting the plurality actions to be carried out on the technical system using the learned optimum action selection rule based on the learned neural network.

* * * * *